United States Patent
Lyle

(10) Patent No.: US 11,465,054 B1
(45) Date of Patent: Oct. 11, 2022

(54) WIRELESS COMMUNICATION DEVICE WITH CONCEALED VALUE IN MOBILE GAMING

(71) Applicant: UIPCO, LLC, San Antonio, TX (US)

(72) Inventor: Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 8 days.

(21) Appl. No.: 17/103,201

(22) Filed: Nov. 24, 2020

Related U.S. Application Data

(60) Provisional application No. 62/943,412, filed on Dec. 4, 2019.

(51) Int. Cl.
*A63F 13/69* (2014.01)
*A63F 13/216* (2014.01)
(Continued)

(52) U.S. Cl.
CPC ............ *A63F 13/69* (2014.09); *A63F 13/216* (2014.09); *A63F 13/332* (2014.09); *A63F 13/35* (2014.09);
(Continued)

(58) Field of Classification Search
CPC .......... A63F 13/69; A63F 13/67; A63F 13/46; A63F 13/35; A63F 13/92; A63F 13/216; A63F 13/332; A63F 13/795
See application file for complete search history.

(56) References Cited

U.S. PATENT DOCUMENTS 8,068,028 B2   11/2011   Phaneuf
8,342,929 B2 * 1/2013   Briggs ................... A63F 13/23
                                                                463/9
(Continued)

FOREIGN PATENT DOCUMENTS

CN   203937383 U   11/2014
CN   102514827 B   2/2015
(Continued)

OTHER PUBLICATIONS

International Preliminary Examination Report dated May 14, 2021 for PCT Application No. PCT/US2019/058449.
(Continued)

*Primary Examiner* — Seng H Lim
(74) *Attorney, Agent, or Firm* — Plumsea Law Group, LLC

(57) ABSTRACT

A method for guiding game play of a game in an augmented reality game space. The game runs on a smart device in conjunction with a game space. The method includes determining that a user has completed a game objective and earned the right to a game piece having a concealed value. Information including an indication that the user has completed the game objective is sent from a smart device to a game server. The game server receives information from the smart device and sends information including a location of the game piece having a concealed value to the smart device and to a confirmation device. The smart device displays a location of the game piece having a concealed value in the augmented reality game space. Also, a system for game play including the smart device, the game server, and the confirmation device.

20 Claims, 13 Drawing Sheets

(51) Int. Cl.
  *A63F 13/332* (2014.01)
  *A63F 13/92* (2014.01)
  *A63F 13/46* (2014.01)
  *A63F 13/67* (2014.01)
  *A63F 13/795* (2014.01)
  *A63F 13/35* (2014.01)

(52) U.S. Cl.
  CPC .............. *A63F 13/46* (2014.09); *A63F 13/67* (2014.09); *A63F 13/795* (2014.09); *A63F 13/92* (2014.09)

(56) References Cited

U.S. PATENT DOCUMENTS

| | | | |
|---|---|---|---|
| 10,022,632 B1* | 7/2018 | McAdoo | G06Q 30/06 |
| 10,717,005 B2* | 7/2020 | Kornmann | H04W 4/02 |
| 10,835,817 B2* | 11/2020 | Itoh | A63F 13/69 |
| 10,872,283 B2 | 12/2020 | Lyle | |
| 2005/0285735 A1 | 12/2005 | Imura et al. | |
| 2006/0187059 A1 | 8/2006 | Fabian et al. | |
| 2006/0258397 A1 | 11/2006 | Kaplan et al. | |
| 2009/0186694 A1* | 7/2009 | Gunawardana | A63F 13/52 463/31 |
| 2010/0169296 A1 | 7/2010 | King et al. | |
| 2012/0019363 A1 | 1/2012 | Fein | |
| 2013/0108041 A1 | 5/2013 | Jordahl | |
| 2013/0154794 A1 | 6/2013 | Menard et al. | |
| 2013/0281206 A1* | 10/2013 | Lyons | G07F 17/323 463/33 |
| 2013/0281207 A1* | 10/2013 | Lyons | G07F 17/3211 463/33 |
| 2013/0281208 A1* | 10/2013 | Lyons | A63F 13/213 463/33 |
| 2014/0266589 A1 | 9/2014 | Wilder et al. | |
| 2014/0274365 A1* | 9/2014 | Riahei | G07F 17/3227 463/29 |
| 2014/0349755 A1* | 11/2014 | Itoh | A63F 13/69 463/31 |
| 2015/0290545 A1 | 10/2015 | Barney et al. | |
| 2016/0067593 A1 | 3/2016 | Yim et al. | |
| 2016/0159535 A1 | 6/2016 | Diaz et al. | |
| 2016/0210484 A1 | 7/2016 | Shi et al. | |
| 2017/0065879 A1 | 3/2017 | Barney et al. | |
| 2018/0293837 A1* | 10/2018 | Hoehne | G07F 17/3244 |
| 2019/0367239 A1 | 12/2019 | Camenisch et al. | |
| 2021/0252384 A1* | 8/2021 | Li | A63F 13/35 |

FOREIGN PATENT DOCUMENTS

| | | |
|---|---|---|
| EP | 2722784 A1 | 7/2019 |
| WO | 2020/092298 | 5/2020 |

OTHER PUBLICATIONS

Invitation to Pay Additional Fees dated Jan. 9, 2020 for Application No. PCT/US2019/058449.
International Search Report and written opinion dated Mar. 3, 2020 for PCT Application No. PCT/US2019/058449.
Non-Final Office Action dated Oct. 26, 2021 for U.S. Appl. No. 17/078,680.

* cited by examiner

WIRELESS COMMUNICATION DEVICE WITH CONCEALED VALUE IN MOBILE GAMING

CROSS-REFERENCE TO RELATED APPLICATIONS

This application claims the benefit of U.S. Provisional Patent Application Ser. No. 62/943,412, filed Dec. 4, 2019, for "Wireless Communication Device with Concealed Value in Mobile Gaming", the entirety of which is hereby incorporated by reference.

BACKGROUND

1. Field

The present disclosure relates to game play in an augmented reality game space. In particular, the disclosure relates to an augmented reality game wherein rewards may be in the form of game pieces having a concealed value, and to a system for game play.

2. Description of Related Art

Many single-user and multiple-user games in which the player or user seeks to complete a task more quickly than other players, to most accurately hit a target, or capture objects, are available. These games are designed to be played alone or with others, and may involve team play.

Scoring in such games often is predictable because the scores obtained are merely the sums of the various objects captured, speed obtained, and the like related to the objective of the game. Scoring may be related to the difficulty of carrying out the task, but the selections are known. Game play becomes repetitive, and players lose interest.

Users may lose interest in games having a 'playing board' format that requires all players be in the same location. Other games that require separation of the players may become disused because of a lack of camaraderie. The thrill of victory is somewhat dampened by the fact that the winner may be alone. With no other players nearby, the fun of winning a multi-player game may be somewhat diminished.

In many games, there is no excitement in ordinary game play. Means of scoring are known, thus leading to boring predictability. Also, loss of objects required to play the game may preclude an enjoyable game, especially if the missing piece object leads to other objects and opportunities to advance.

There is a need in the art for a system and method that addresses the shortcomings of the prior art discussed above.

SUMMARY

In one aspect, the disclosure provides a method for guiding game play of a game in an augmented reality game space. The game runs on a smart device in conjunction with a game space. The method comprises determining that a user has completed a game objective and earned the right to a game piece having a concealed value. Information including an indication that the user has completed the game objective is sent to the game server. The game server receives information from the smart device and sends information including a location of the game piece having a concealed value to the smart device. The smart device displays a location of the game piece having a concealed value in the augmented reality game space.

In another aspect, the disclosure provides a method for guiding game play. In accordance with the method, the information sent from the game server to the smart device includes a prize passcode. The prize passcode also is sent to a confirmation device at the location of the game piece having a concealed value.

In still another aspect, the disclosure provides a system for playing an augmented reality game. The system includes a game server configured to receive from a mobile system information of a completed game objective, to choose a location for the game piece having a concealed value, and to send a prize passcode to the mobile system. The prize passcode also is sent to a confirmation device, if one is present. The system for playing also includes a mobile system comprising a smart device and configured to determine that the user has completed a game objective, send information regarding completion of a game objective, and receive a prize passcode.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The disclosure provides a system for playing an augmented reality game. The game will be described in detail herein as it relates to a single user. Game play may include two or more players. The players may play co-operatively, as for a team, or may play individually against the other players. However, game play unique to multiple users may be set forth herein. Game play includes an aspect of unpredictability and excitement not found in earlier games. A game piece having a concealed value provides excitement as the value is discerned. Sponsorship of game play by vendors and advertisers in the game space also may improve business and community relationships. Importantly, a user's ability to store or retain things of value in an account accessed from a game system provides secure storage of those things, as described below.

Figure 1:
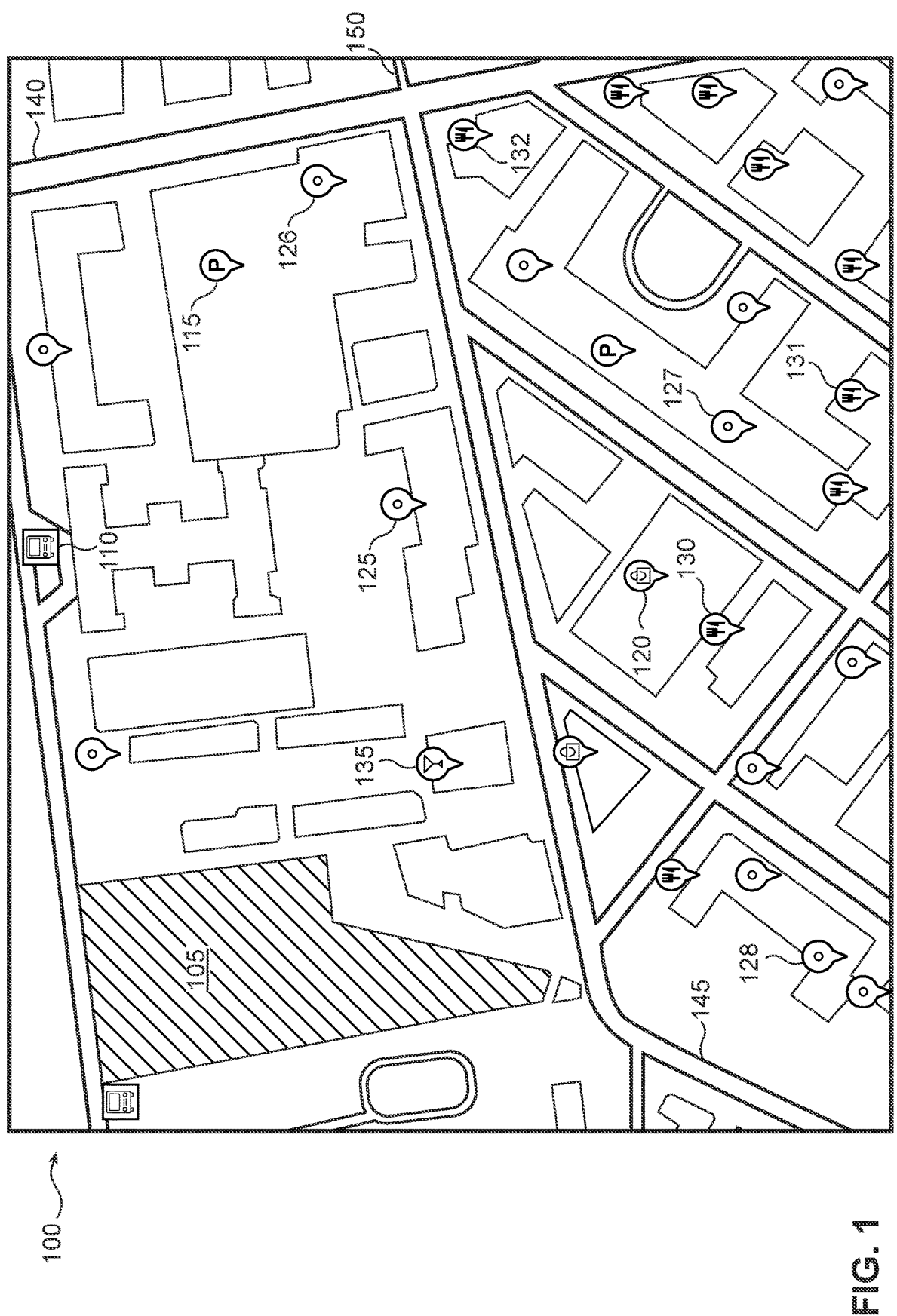
FIG. 1 illustrates an area for game play in accordance with an embodiment.

FIG. 1 illustrates an embodiment of a game space relevant to the system discussed below and shown in FIG. 2. Game space 100 is an arbitrary game space, or a game space having artificial boundaries. Various features may be found in game space 100. Park 105 provides an area within game space 100 that may have trees, paths, benches, fountains, trash receptacles, food vendors, and other features, such as climbing bars, teeter-totters, and other devices. For convenience, only selected members of a group of items have been identified on FIG. 1 with a reference number. Although the disclosure herein may address only these numbered members of a group or category, it is understood that the disclosure applies to every member of the group or category. The unnumbered features may have the same or different properties and characteristics as the numbered features in that group or category. For example, some restaurants may be fine dining destinations while others may have a playground for children.

Other features may include transit stop 110, parking structure 115, and shopping facility 120. Game space 100 also may include first personal location 125, second personal location 126, third personal location 127, and fourth personal location 128. Such personal locations may be stores and boutiques, churches and places of worship, libraries, schools, and the like.

In some embodiments, additional features may be available. In game space 100, first restaurant 130, fine dining restaurant 131, first café 132, and first lounge 135 are identified. A system of streets 140, lanes 145, and paths 150 may be representative of all of the streets in the street group, lanes in the lanes group, and paths in the path group in the game space. In some embodiments, the game play may exclude businesses and locations that maybe considered to be 'adult' places. Examples of such adult places include lounge 135, liquor stores, fine dining restaurant 131, tobacconists, and the like. These and other 'adult' places may be eliminated from consideration in some embodiments of game play intended for children.

Figure 2:
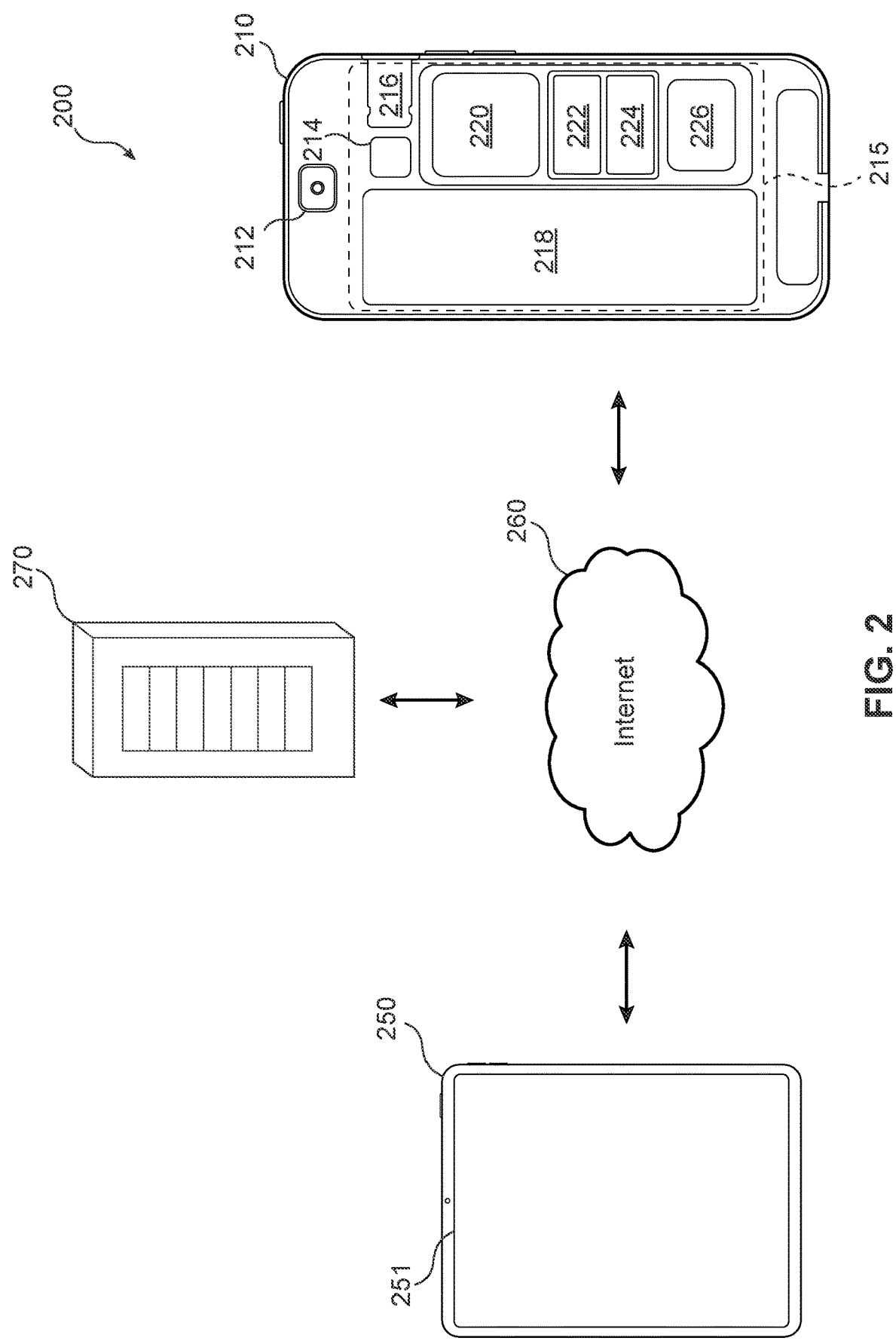
FIG. 2 illustrates a system for game play in accordance with an embodiment.

FIG. 2 illustrates an embodiment of system 200 for game play. System 200 comprises game server 270 that sends information to and receives information from other devices in the system by way of internet 260. System 200 also includes smart device 210, which may be a mobile device such as a smart phone. Game server 270 is configured to receive information from a mobile system, such as smart device 210. In some embodiments, the information sent to game server 270 through internet 260 relates to a completed game objective. Game server 270 also may choose a location for a game piece having a concealed value. Game server 270 also may send a prize passcode to the mobile system.

In some embodiments, confirmation device 250 may form part of system 200. Confirmation device 250 may be used to confirm information relating to a completed objective. Such information may include a prize passcode. Information may be exhibited, displayed, or disclosed on screen 251 of confirmation device 250.

System 200 also includes a mobile system comprising a smart device. Smart device 210 may be a smart telephone. In some embodiments, smart device 210 is configured to determine that the user has completed a game objective. Smart device 210 may send information regarding completion of a game objective to game server 270 through internet 260. Game server 270 then sends a prize passcode to smart device 210. In some embodiments, game server 270 also may send the prize passcode to confirmation device 250, if one is present.

Communication module 222 enables flow of information, such as by cellular circuits, WiFi, Bluetooth®, and near-field communication, between and amongst the information sources, i.e., internet 260, confirmation device 250, and smart device 210. Smart device 210 includes camera 212, GPS 214, and processing unit 220. Smart device 210 further includes SIM card 216, memory 224, battery 218, and connection module 226. Each of these features functions in the typical way for a smart device. Connection module 226 enables wired connection of smart device 210 to other devices, to a charger, for example. Information is disclosed on screen or display 215 of smart device 210. In some embodiments, confirmation device 250 may form part of system 200. Information may be exhibited or disclosed on screen 251 of confirmation device 250.

The disclosure also provides a method for guiding game play of a game in an augmented reality game space. The game runs on smart device 210 in use within a game space. The method comprises determining that a user has completed a game objective and earned the right to a game piece having a concealed value. Information including an indication that the user has completed the game objective is sent to game server 270. Game server 270 receives information from smart device 210 and sends information including a location of the game piece having a concealed value to smart device 210. Smart device 210 displays a location of the game piece having a concealed value in the augmented reality game space.

Electronic games, or games that may be played with a smart device, may be played outdoors in a game space limited by, for example, the boundaries of a park or an area bounded by selected streets. Similarly, such a game may have an indoor game space such as a floor of a building, or the entirety of a building. The game space also may be a combination of indoor and outdoor areas, such as a building and the building grounds. A game space also may encompass an area having random or arbitrary boundaries. Random or artificial boundaries are boundaries that need not follow a natural contour or pre-existing boundary. Game play may be successfully achieved in any type of game space. For convenience herein, the game space is described as an outdoor game space having artificial boundaries.

In some embodiments, game pieces may be positioned in predetermined locations, such as those identified in FIG. 1. These game pieces may be ordinary items typically found within the game space. Game pieces may be considered tokens to be redeemed for prizes. The actual value of the prize associated with each game piece is determined and established in game server 270. Typically, the actual valued of a prize is not revealed until the game piece is redeemed.

In some embodiments, game server 270 establishes the value of each game piece having a concealed value dynamically. Any evaluation technique may be used. The evaluation may be made when the game piece having the concealed value is available in the game space, when the right to have the game piece having a concealed value is acquired by the user, or when the token is redeemed for value. For example, game server 270 may establish a high value for the first, fifth, and tenth game pieces having a concealed values that are found in a multi-player game. Alternatively, value may be set in a pari-mutuel arrangement. Game play that requires that the users pay fees to play, the various fees may be placed in a pool. In accordance with pari-mutuel wagering practices, the proceeds of the fees may be pooled, any expenses and taxes are deducted from the pool, and the pool is shared amongst the winners. In accordance with the pari-mutuel technique, the number of players seeking a game piece having a concealed value may be used to establish a pari-mutuel pool.

In some embodiments, the game space may have a theme. For example, the game space may have within its boundaries a number of competing stores of a type, such as a hardware store. In some embodiments, the stores could cooperate to sponsor game play within the region. For example, incentives could be given to visit each hardware store. In some embodiments, incentives could be given to visit only one hardware store, for example, if that store sponsored the game.

In some embodiments, businesses may sponsor game play by placing advertising in the game space. In some embodiments, the advertising may be placed on the game pieces having a concealed value. In some embodiments, the advertising may be placed in the augmented reality screens. Advertising may be placed on augmented reality screens at the location of the store, or may be a simple 'congratulations' message when a game objective is achieved. In some embodiments, a sponsor could augment the value of a game piece having a concealed value if it is redeemed at his store. Other themed game play may involve safety campaigns, incentives to purchase pets and pet-related goods, and prizes of various values in a candy shop or ice cream parlor. These and other arrangements may be used.

In some embodiments, a game play sponsor may augment the value assigned to a game piece having a concealed value by game server 270. This additive value may be in the same currency as the game piece having a concealed value such as points or money. The additive value may be a supplemental prize, such as a gift certificate from the sponsor's business, or a product from the store. Information relating to values and earnings by each player is relayed to game server 270. The ability of game server 270 to establish values for the game piece provides significant flexibility to provide games having various payout means, thus attracting a variety of players. Also, the ability to assign additional or supplemental values provided by sponsors yields the ability to attract sponsors to underwrite game play costs of players.

Game pieces having a concealed value and associated or related prizes may be distributed throughout the augmented reality game space. In some embodiments, game pieces are associated with a game objective. In some embodiments, a game objective may be to win a footrace against an augmented reality runner in an augmented reality version of a local track or a generally-known location, such as a baseball stadium or football stadium. In some embodiments, the game objective may be to capture or to defeat a monster, a dragon, or any game character generated in augmented reality.

Figure 3:
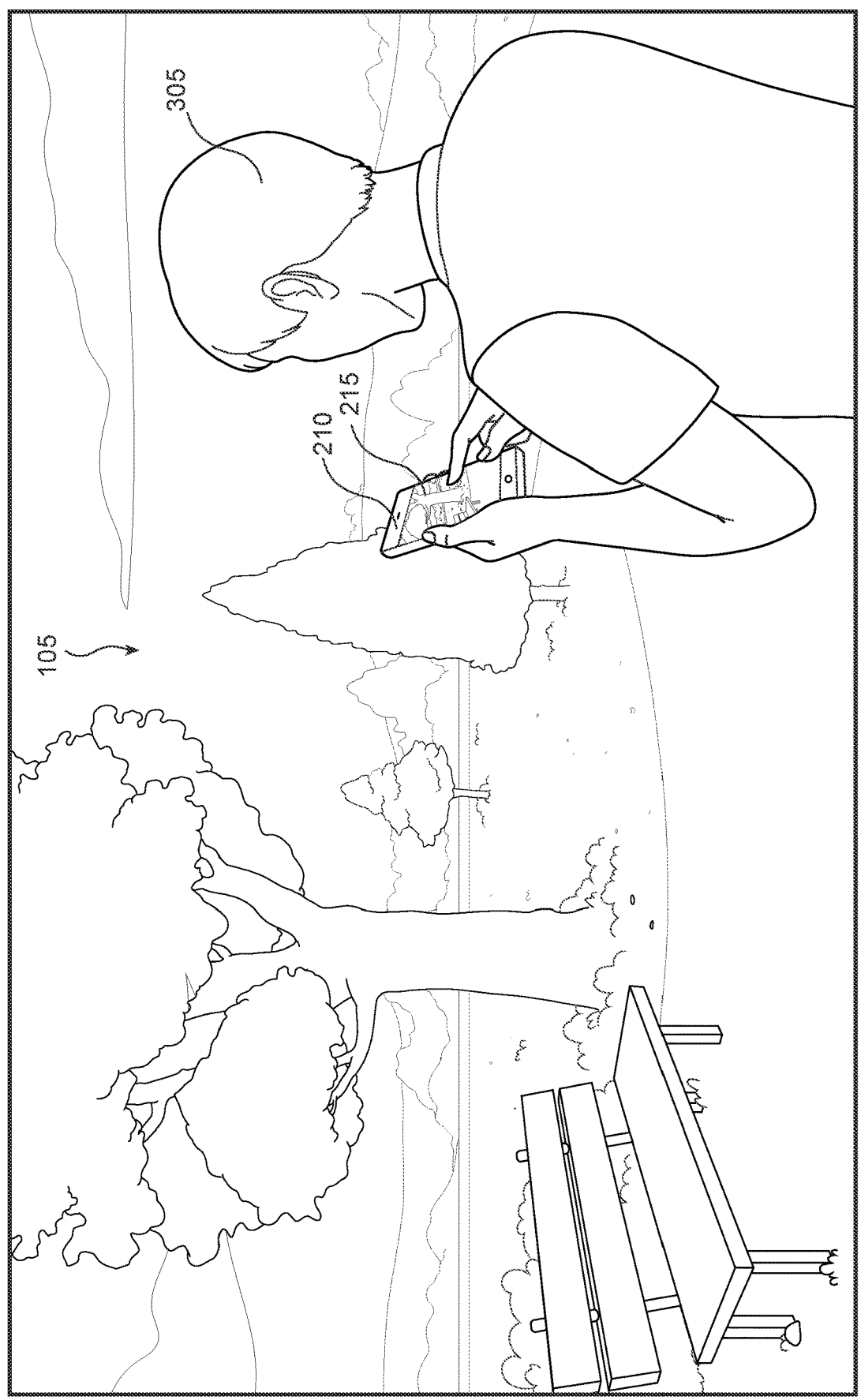
FIG. 3 illustrates an embodiment of a user engaging in game play.

FIG. 3 illustrates player or user 305 attempting to identify the location of a game piece having a concealed value. An augmented reality game is running on smart device 210 while user 305 is in park 105 within the game space illustrated on FIG. 1. As can be seen in FIG. 3, display 215 is showing the portion of park 105 at which camera 212 of smart device 210 is pointed. User 305 is manipulating the view through smart device 210 to find a game piece having a concealed value and the game objective associated therewith.

Figure 4:
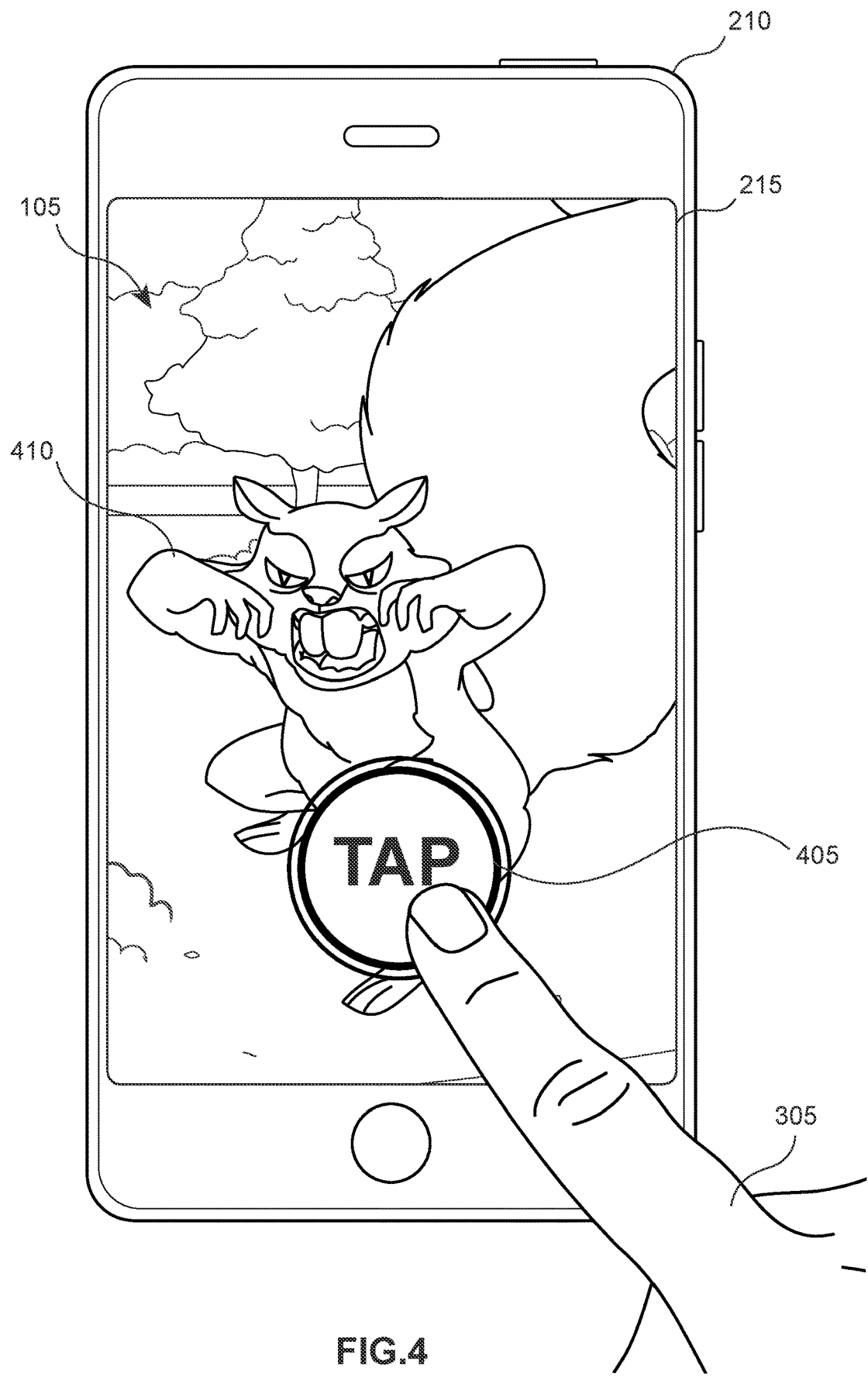
FIG. 4 illustrates an embodiment of a user during game play.

In some embodiments, display 215 shows the view available through camera 212 of smart device 210 and enhances it with an augmented reality supplement. The augmented reality supplement, or overlay, is provided by game server 270 through internet 260. One augmented reality contribution is illustrated in FIG. 4. FIG. 4 illustrates game character 410 as a menacing animal. Game character 410 was identified by using smart device 210 in park 105. The image of game character 410 is provided to display 215 of smart device 210 by augmented reality from game server 270. Game server 270 delivers the image through internet 260 to smart device 210.

In some embodiments, when game character 410 is identified on smart device 210, user 305 then may be presented with a game objective. In the embodiment illustrated in FIG. 4, the game objective is to defeat or control game character 410. In some embodiments, defeating or controlling game character 410 requires that activation button 405 be pushed by user 305. In some embodiments, the game objective may be met by tapping activation button 405 a preselected number of times in a certain period. In some embodiments, it may be necessary to tap activation button 405 with a certain pressure, for smart devices that have a screen that is sensitive to multiple pressure levels to give different results. In some embodiments, pressing activation button 405 for a certain period may be the game objective. The game objective may be established by game server 270 in response to information related to the age or skill of user 305.

If user 305 fails to achieve the game objective, a disparaging screen may appear. The message to be displayed may be sent from game server 270 through internet 260 to display 215 of smart device 210. The message may be related to the age or skill level of user 305. In some embodiments, the screen may say "You are too slow to defeat me!" In some embodiments, the screen may say "You are too weak to defeat me!" In some embodiments, a disparaging message based on the skill necessary to defeat or capture game character 410 may be displayed. In some embodiments, such as embodiments played by children, an encouraging message, such as "Sorry, you failed." or "Nice try!" may be more appropriate. In embodiments, "Try again!" may be displayed.

In some embodiments, if user 305 fails to achieve the game objective, another attempt may be allowed. In some embodiments, failure to achieve the game objective precludes another attempt. In a multi-player embodiment, failure to achieve a game objective may preclude another attempt until another player has attempted to achieve the game objective. In some embodiments of multi-player play, the team of a player who fails to achieve a game objective may be excluded from a repeat attempt until a player from the other team has had an opportunity to achieve the game objective.

In some embodiments, smart device 210 may determine that user 305 has achieved a game objective and confirms that user 305 has earned the right to a game piece having a concealed value. Smart device 210 then sends, through internet 260 to game server 270 information indicating that user 305 has achieved a game objective and has earned the right to a game piece having a concealed value.

In some embodiments, upon receiving confirmation that a game piece having a concealed value has been earned, game server 270 sends to smart device 210 information including a location of a game piece having a concealed value. The location may be identified after a congratulatory message.

Figure 5:
FIG. 5 is an embodiment of evidence that a game objective has been completed.

FIG. 5 illustrates a congratulatory screen that may be displayed when the game objective has been achieved. As user 305 tries to defeat game character 410 in park 105, game character 410 may become a smaller, more typical, size and may become less menacing as an indicator that user 305 is carrying out the correct technique for achieving the game objective. Game character 410 may display a flag of surrender, as illustrated in FIG. 5, as an indicator the user 305 has achieved the game objective. In some embodiments, game character 410 may appear to be dead or to have been captured, as with a net over the body of game character 410. Display 215 of smart device 210 also may show a congratulatory message. In some embodiments, the message may be presented on display 215 of smart device 210 also may include an instruction to collect the prize nearby. Then, user 305 may move the camera 212 around park 105 in game space 100.

Figure 6:
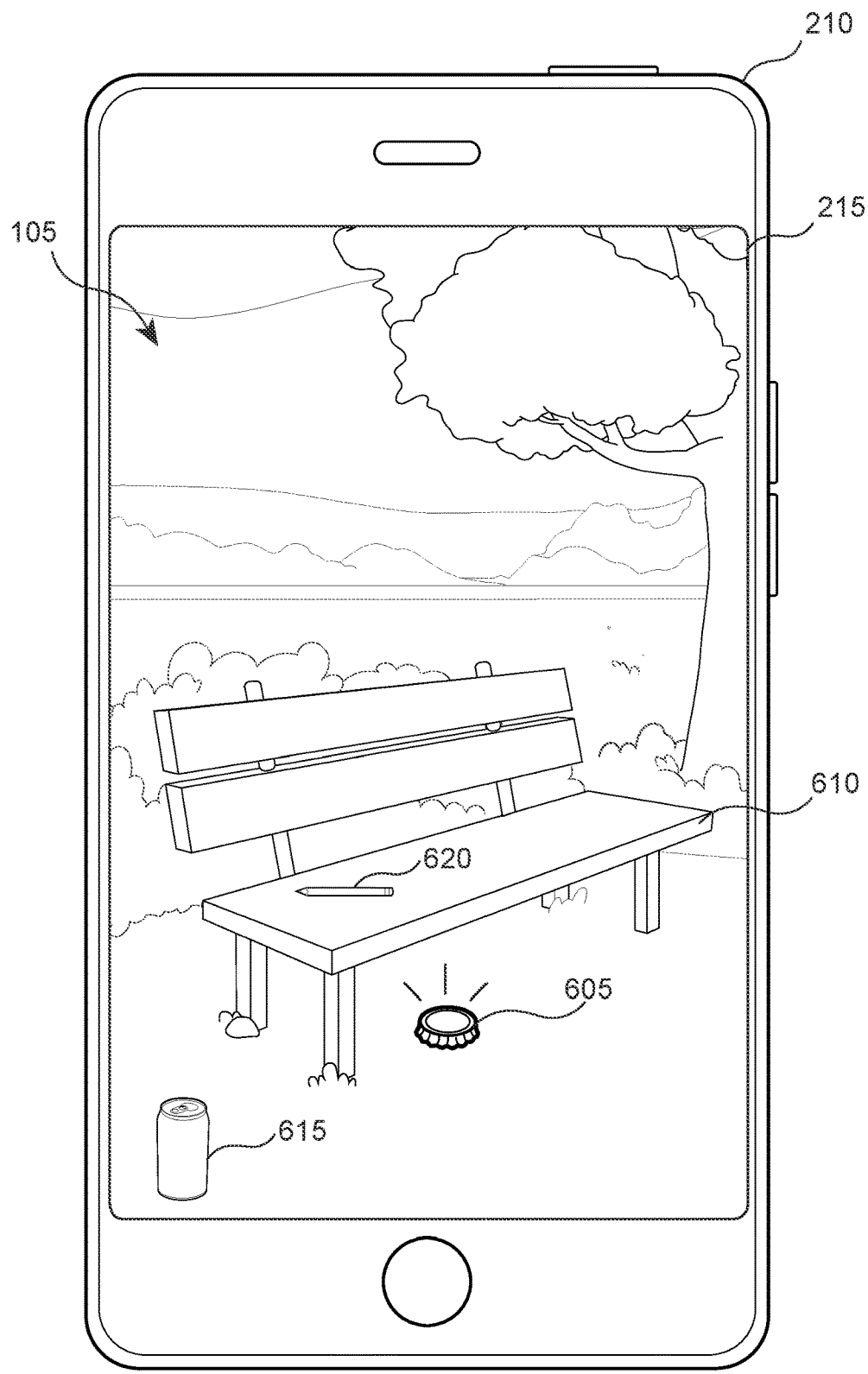
FIG. 6 is an embodiment of an illustration of a game piece having a concealed value at the player's location.

In some embodiments, as user 305 moves camera 212 around the area, various game play objects may appear. The images of these objects may be generated by augmented reality and forwarded to smart device 210 from game server 270 through internet 260. As can be seen in FIG. 6, three objects may appear to be on or near park bench 610. Bottle cap 605, can 615, and pen 620 may be seen in display 215 of smart device 210. These objects are game pieces having concealed values. However, as can be seen, bottle cap 605 is highlighted in augmented reality. Thus, bottle cap 605 is a game piece having a concealed value greater than any value to be found in the other of the game pieces.

In some embodiments, there may be others playing other games simultaneously, but using the same game pieces having concealed values. In such embodiments, there exists a clear advantage to being able to identify the game piece having the highest value with the signals provided from game server 270 through internet 260 to smart device 210.

User 305 then may select bottle cap 605 as the prize for completing the game objective. This game piece represents the actual prize, which may be awarded at a later time. The actual prize may be anything of value, including points that may be added to other points earned at other steps in the game play. Bottle cap 605 may have a code printed or otherwise associated with the physical cap. In some embodiments, a QR code may be present. In some embodiments, bottle cap 605 may include a near-field communication (NFC) chip. Either type of code may be read by smart device 210. If the prize is points, the value may be added immediately to the account of user 305. In this case, smart device 210 may communicate the value of the prize to game server 270 through internet 260. Game server 270 then may add the value of the prize to the value of the account to obtain a new value of the account. In some embodiments, game server 270 thus provides secure storage of value in the user's account, as smart device 210 is required to access the account. This new value then may be communicated from game server 270 to smart device 210 through internet 260. In some embodiments, a sponsored prize may be picked up at the office of the sponsor. Although a prize may be transferred to the user's account, a prize also may be left in the custody of another for use in the future. For example, a prize from a business may be treated like a gift card at that business. In some embodiments, the new value may be made available to other players from game server 270 through internet 260. Any tangible prizes may be obtained in a different way.

The disclosure also is directed to another embodiment of a method for guiding gameplay. In this embodiment, after smart device 210 communicates to game server 270 that a game objective has been achieved and the right to a game piece having a concealed value has been earned, game server 270 may send information, including the location of the game piece having a concealed value, to smart device 210. Game server 270 also may send a prize passcode to smart device 210 and to confirmation device 250 at the location of the game piece having a concealed value. User 305 then follows navigation instructions to the location of the game piece having a concealed value and of the prize by following navigation directions to the location of confirmation device 250.

Figure 7:
FIG. 7 is embodiment of an illustration of a game piece having a concealed value at a location remote from the player.

FIG. 7 is illustrative of a message that may be sent to display 215 of smart device 210. In embodiments requiring navigation instructions, the screen in FIG. 7 may be sent to smart device 210. The screen may contain congratulatory and encouraging statements, and may include navigation button 705. Activation of navigation button 705 sends a signal to game server 270 that smart device 210 is ready to receive navigation instructions. Game server 270 then returns navigation directions to smart device 210.

Figure 8:
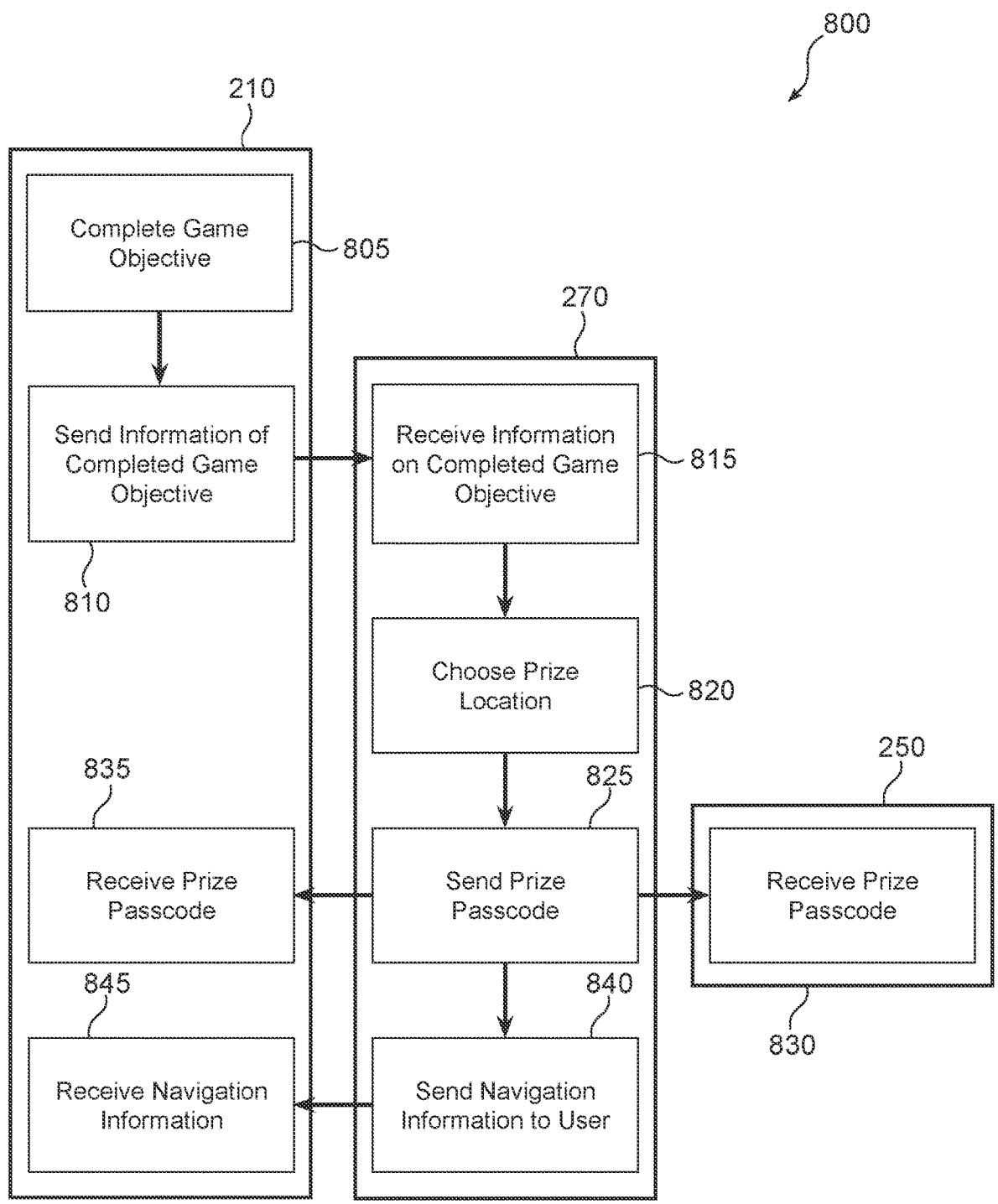
FIG. 8 is a flow chart illustrating steps of an embodiment and illustrating which device in the system hosts the step.

FIG. 8 illustrates for system 800 the interactions of embodiments of the parts of a system. Smart device 210 may confirm that a game objective is completed in step 805. In step 810, smart device 210 then may forward information of completion to game server 270. Game server 270 may receive information about completion of a game objective in step 815 and may choose the location of the prize in step 820. In step 825, game server 270 may send the prize passcode to both smart device 210 and confirmation device 250. Smart device 210 may receive the prize passcode in step 835 and confirmation device 250 receives the passcode in step 830. In step 840, game server 270 may send navigation information to smart device 210. In step 845, smart device 210 receives the information for display to user 305. Examples of these steps are provided in the following figures.

Figure 9:
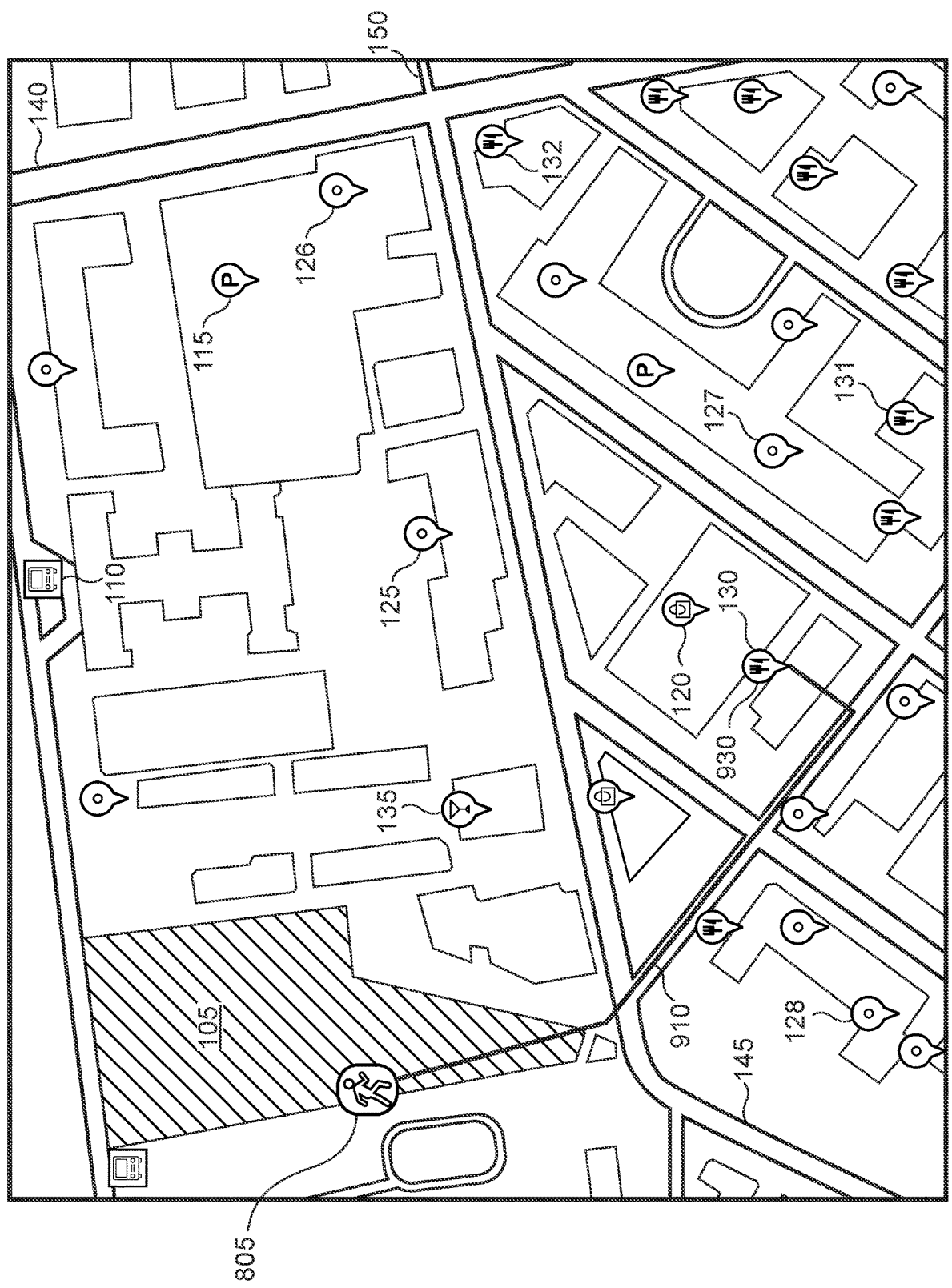
FIG. 9 is an illustration of an embodiment of directions to a remote game piece.

In some embodiments, navigation instructions 910 may be provided as a route on a map, as illustrated in FIG. 9. As shown, user 305 at location 905 in park 105 is illustrated at a start point. Navigation instructions 910 are indicated on the map. Navigation instructions 910 end at first restaurant 130, which also may be labelled as prize location 930. In some embodiments, prize location 930 may be selected to be age-appropriate. Thus, if a child is playing the game, first restaurant 130 may be a suitable family-type restaurant. Lounge 135 may be considered inappropriate as the prize location for a child playing the game. These types of considerations may be installed into game server 270 at the time the game is begun.

In some embodiments, directions may be given in another way. For example, directions may be expressed by a compass direction and distance from user 305. Such a style may be particularly suited for students of orienteering. In a game space that has buildings and other obstacles to travel, the directions may be expressed so that the instructions align with streets, lanes, and paths that allow free travel. In some embodiments, the directions may be expressed as a single direction and distance, with a feasible route to be determined or calculated by the user. In some embodiments, the direction may name streets and identifying cross-streets and directions to turn. Any such method is suitable.

Figure 10:
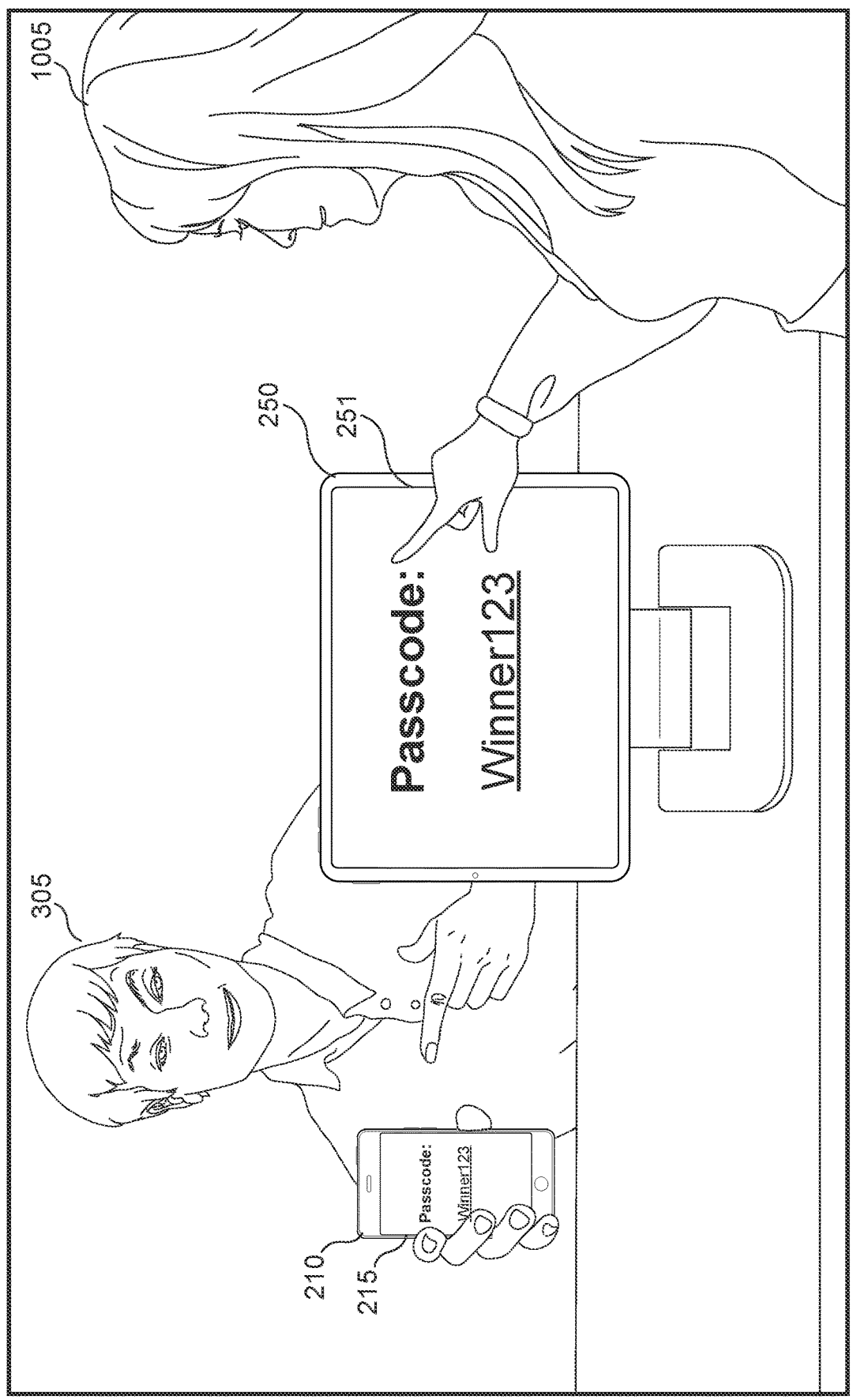
FIG. 10 is an illustration of an embodiment of claiming a prize with a prize passcode.

FIG. 10 illustrates a scenario wherein user 305 displays a prize passcode on display 215 of smart device 210 to employee 1005 of prize location 930. The same prize passcode has been forwarded from game server 270 through the internet to confirmation device 250 and smart device 210. Thus, when user 305 presents a prize passcode, employee 1005 calls up the prize passcode on confirmation device 250. When the prize passcodes match, user 305 is awarded the prize.

Figure 11:
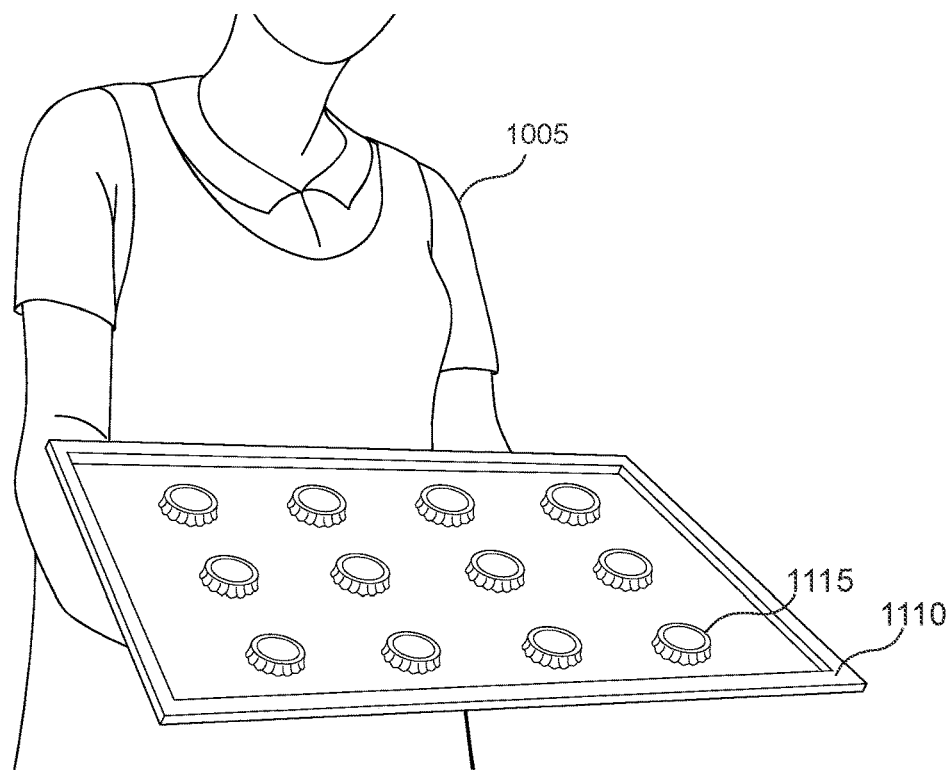
FIG. 11 illustrates an embodiment of selecting a game piece having a concealed value.
Figure 11:
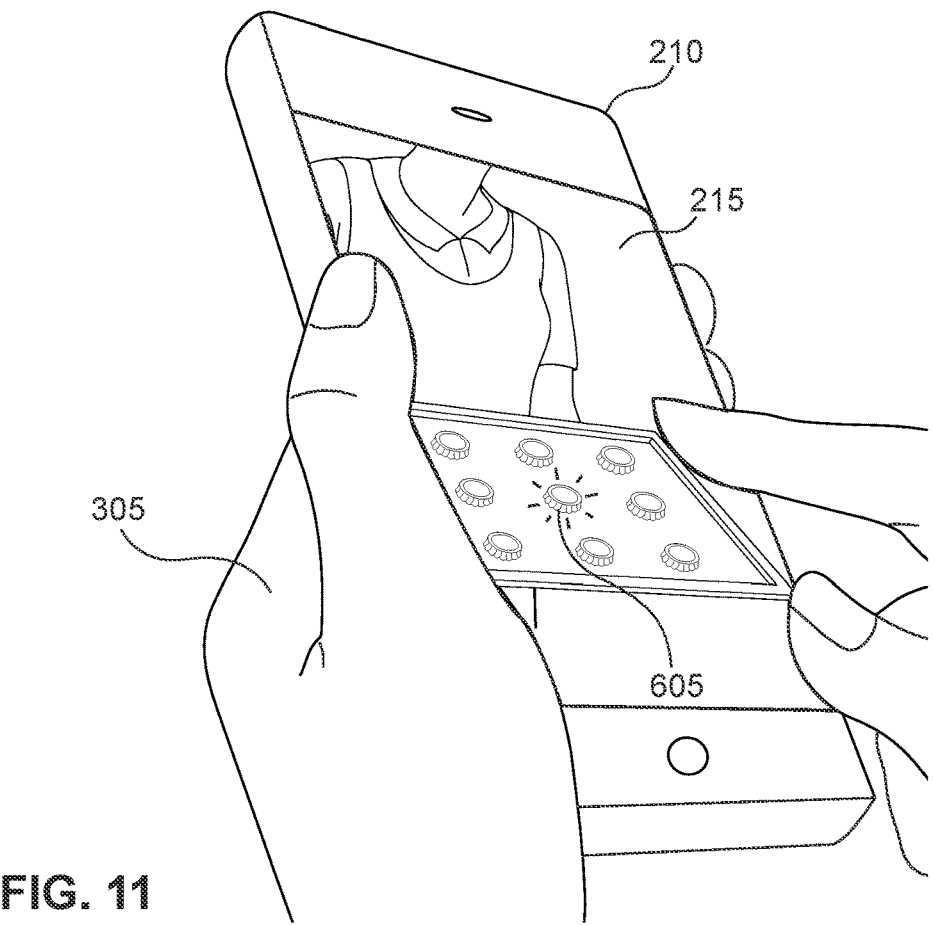

In embodiments, the prize may be one of a plurality of prizes that look identical to the unaided eye. In such a circumstance, the prize value may be printed or otherwise put onto the game pieces having a concealed value in a manner that is not visible to the unaided eye. In some embodiments, the game pieces 1115 will be arranged on a tray 1110 offered by employee 1005, as illustrated in FIG. 11, or in any suitable way. Because the value of the game piece is concealed, it may be necessary to have equipment that can identify which game piece to select. To provide the ability to identify the valuable game piece having a concealed value, an infrared notch filter for the correct range of infra-red light may be supplied from game server 270. Such a filter uses a particular band of infrared that will enable user 305 to select the game piece having a concealed value. As shown in FIG. 11, user 305 uses the infra-red notch filter through camera 212 of smart device 210 to identify bottle cap 605 as the prize token.

Figure 12:
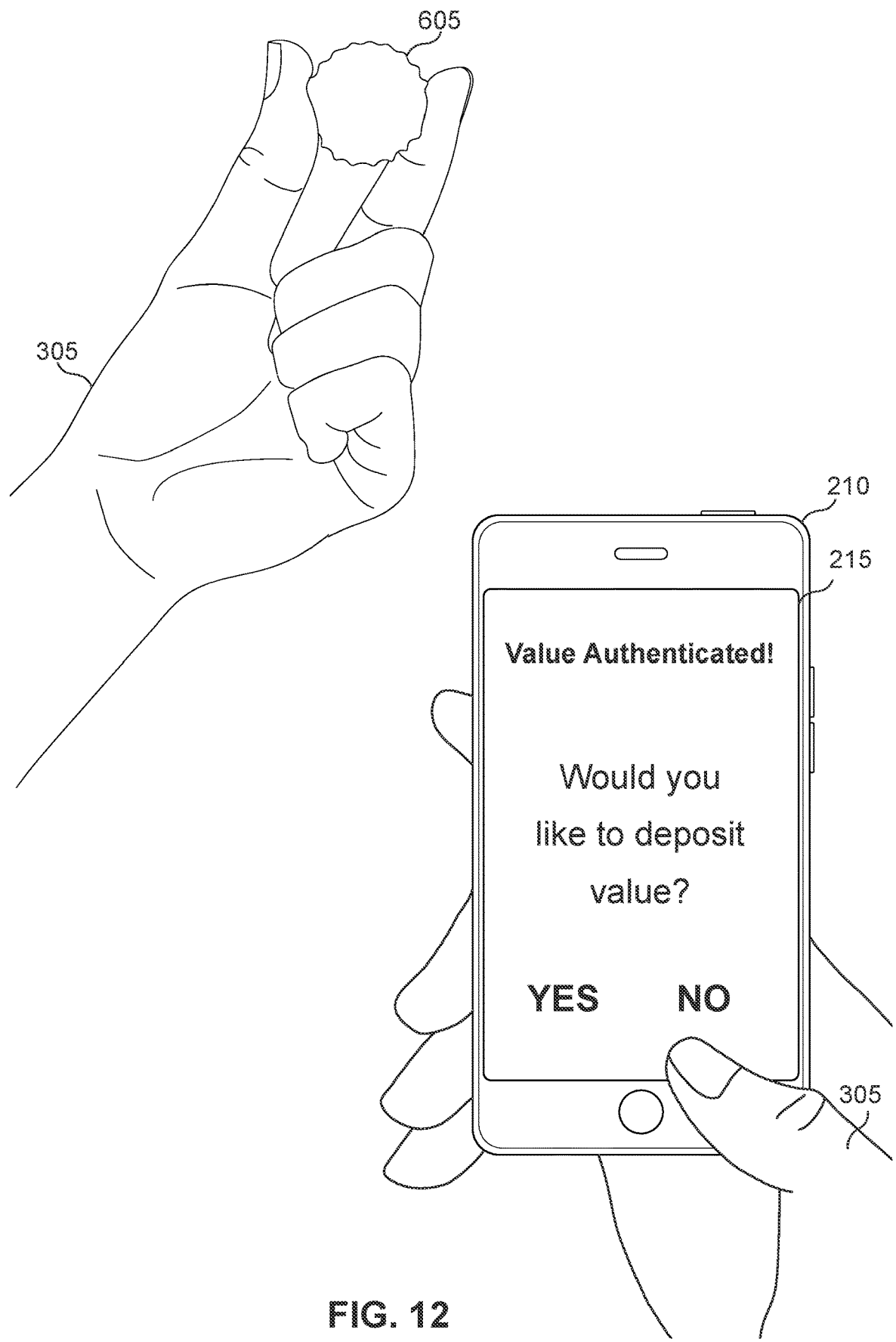
FIG. 12 illustrates an embodiment of an action that can be taken after earning a game piece having a concealed value.

FIG. 12 illustrates some embodiments of redemption opportunities for user 305 having winning bottle cap 605 in his possession. Game server 270 may authenticate the value of the prize, as read by smart device 210 and forwarded by way of internet 260. Authentication by game server 270 is forwarded to smart device 210 to show a message on display 215. The message may be congratulatory, or it may enquire whether, if the prize is points, user 305 would like to deposit the value of the prize into the account of user 205. The user may select deposit or another option.

Figure 13:
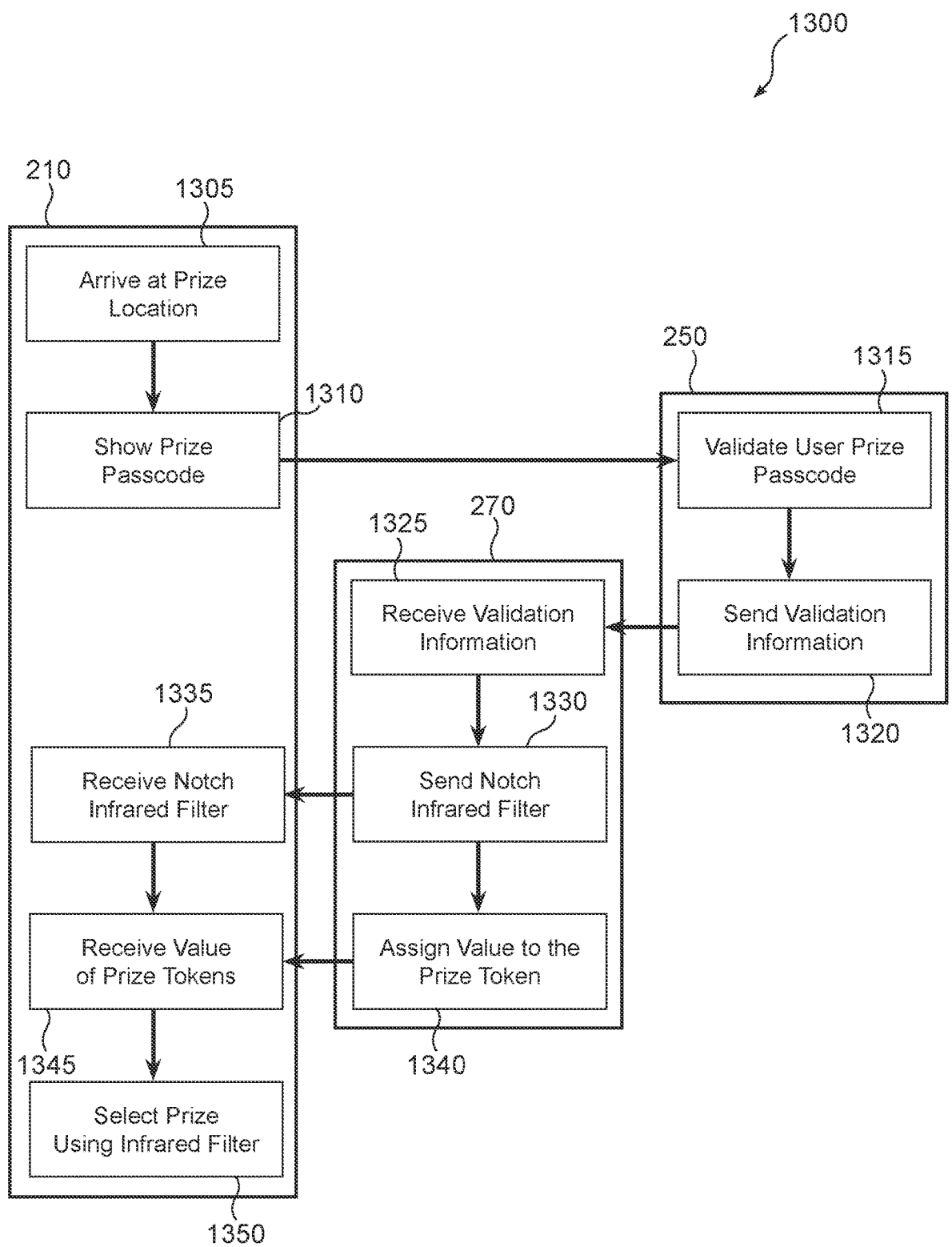
FIG. 13 is a flow chart of an embodiment of claiming a prize.

FIG. 13 illustrates the roles of smart device 210, game server 270, and confirmation device 250 in this exchange. In some embodiments of system 1300, user 305 arrives with smart device 210 at prize location 930 in step 1305. In step 1310, user 305 shows the prize passcode on display 215 to employee 1005, who may validate the win by comparing the prize passcode on display 215 with the passcode on screen 251 of confirmation device 250 in step 1315. Confirmation device 250 may send validation information at step 1320 to game server 270, which may receive the information at step 1325. Game server 270 then may send infra-red notch filter at step 1330, which may be received at step 1335 by smart device 210 in the possession of user 305. Game server 270 also may assign value to the prize in step 1340 and may provide that value to smart device 210 in step 1345. Employee 1005 presents prizes to user 305, who may use the infra-red notch filter to select the prize identified by the filter in step 1350. The prize may be securely retained by employee 1005 at the business so that user 305 may use the prize or take possession of it at another time.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for guiding gameplay of a game in an augmented reality game space, the game running on a smart device in conjunction with a game space, the method comprising:
   determining that a user has completed a game objective and earned the right to a game piece having a concealed value;
   sending information to the game server, the information indicating that the user has completed the game objective;
   receiving information from the game server, the information including a location of the game piece having a concealed value;
   identifying on a display of the smart device a location of the game piece having a concealed value in the augmented reality game space; and
   dynamically setting in the game server the value of the game piece having a concealed value.

2. The method of claim 1, further comprising:
   distinguishing on a display of the smart device the game piece having a concealed value.

3. The method of claim 2, further comprising:
   sending information from the game server to the display of the smart device to display the game piece having a concealed value.

4. The method of claim 3, further comprising:
   revealing to the user the location of the game piece having a concealed value by augmenting the view of the game piece having a concealed value on the smart device.

5. The method of claim 1, further comprising:
   adding the value of the game piece having a concealed value to an account associated with the user and stored in the server.

6. The method of claim 1, further comprising:
   augmenting the display of the game piece having a concealed value by use of a notch infrared filter on the game server and on the smart device.

7. The method of claim 1, further comprising:
   selecting the location of the game piece having a concealed value based on an age of the user.

8. A method for guiding gameplay of a game in an augmented reality game space, the game running on a smart device in conjunction with a game space, the method comprising:
   determining that a user has completed a game objective and earned the right to a game piece having a concealed value;
   sending information to the game server, the information indicating that the user has completed the game objective;
   receiving information from the game server, the information including a location of the game piece having a concealed value; and
   sending a prize passcode from the game server to the smart device and to a device at the location of the game piece having a concealed value.

9. The method of claim 8, further comprising;
   receiving information from the game server, the information including navigation information to the location of the game piece having a concealed value.

10. The method of claim 9, further comprising:
    comparing the prize passcode from the smart device with the prize passcode provided to the device at the location of the game piece having a concealed value to determine whether to reveal the location of the game piece having a concealed value to the user.

11. The method of claim 10, further comprising:
sending the location of the game piece having a concealed value from the game server to the smart device; and
revealing the location of the game piece having a concealed value by augmenting the view of the game piece having a concealed value in the game space, as depicted in the screen of the smart device.

12. The method of claim 10, wherein the game server dynamically values the game piece having a concealed value.

13. The method of claim 11, wherein the game server dynamically values the game piece having a concealed value.

14. The method of claim 8, further comprising:
transferring the value of the game piece having a concealed value to an account associated with the user and storing the account in the server.

15. A system for playing an augmented reality game, the system comprising:
a game server configured to receive from a mobile system information of a completed game objective, chose a location for the game piece having a concealed value, send a prize passcode to the mobile system and to a confirmation system; and
a mobile system comprising a smart device and configured to determine that the user has completed a game objective, to send information regarding completion of the game objective, and to receive a prize passcode.

16. The system of claim 15, further comprising
a confirmation device at the location of the game piece having a concealed value configured to receive a prize passcode from the game server.

17. The system of claim 16, wherein
the game server is further configured to provide navigation information to the smart device; and
the smart device is further configured to receive navigation information and display it to the user.

18. The system of claim 15, wherein the game server is further configured to dynamically value the game piece having a concealed value.

19. The system of claim 17, wherein the game server is further configured to send an infra-red notch filter to the smart device.

20. The system of claim 19, wherein the game server is further configured to dynamically value the game piece having a concealed value.

* * * * *